United States Patent
Walbrecker et al.

(10) Patent No.: US 9,239,255 B2
(45) Date of Patent: Jan. 19, 2016

(54) MAGNETIC FLOWMETER

(75) Inventors: Sven Walbrecker, Wesel (DE); Stefan Neuburger, Stadecken-Elsheim (DE); Josef Neven, Mours St. Eusèbe (FR)

(73) Assignee: KROHNE Messtechnik GmbH, Duisburg (DE)

( * ) Notice: Subject to any disclaimer, the term of this patent is extended or adjusted under 35 U.S.C. 154(b) by 395 days.

(21) Appl. No.: 13/478,704

(22) Filed: May 23, 2012

(65) Prior Publication Data
US 2012/0304780 A1      Dec. 6, 2012

(30) Foreign Application Priority Data

Jun. 6, 2011   (DE) .......................... 10 2011 104 799

(51) Int. Cl.
*G01F 1/58*      (2006.01)

(52) U.S. Cl.
CPC ......................................... *G01F 1/58* (2013.01)

(58) Field of Classification Search
CPC ............................................................ G01F 1/58
USPC ............................................ 73/861.11–861.15
See application file for complete search history.

(56) References Cited

U.S. PATENT DOCUMENTS

| | | | |
|---|---|---|---|
| 7,261,001 B2 * | 8/2007 | Heijnsdijk et al. | 73/861.12 |
| 7,383,739 B2 | 6/2008 | Hofmann | |
| 2006/0144161 A1 * | 7/2006 | Heijnsdijk et al. | 73/861.12 |
| 2007/0017302 A1 * | 1/2007 | Kaneko | 73/861.12 |
| 2009/0266155 A1 * | 10/2009 | Maute | 73/861.12 |
| 2010/0126282 A1 * | 5/2010 | Neuburger et al. | 73/861.12 |
| 2010/0132478 A1 | 6/2010 | Pelayo | |
| 2010/0132479 A1 * | 6/2010 | van Willigen | 73/861.12 |

FOREIGN PATENT DOCUMENTS

| | | |
|---|---|---|
| DE | 197 08 857 A1 | 7/1998 |
| DE | 10 2004 063 617 A1 | 6/2006 |
| DE | 10 2005 019 418 A1 | 11/2006 |
| DE | 10 2008 057 756 A1 | 5/2010 |

* cited by examiner

*Primary Examiner* — Lisa Caputo
*Assistant Examiner* — Philip Cotey
(74) *Attorney, Agent, or Firm* — Roberts Mlotkowski Safran & Cole, PC; David S. Safran

(57) ABSTRACT

A magnetic flowmeter (8) for measuring the flow of a flowing medium having a measuring tube (1) with a cross section that changes along its length and preferably the cross section in the middle section of the measuring tube (1) is less than at the beginning and end of the measuring tube (1), preferably the cross section of the measuring tube (1) is rectangular in its middle section and wherein the housing (2) preferably has a circular cross section. The inlet section (5) of the measuring tube (1) is formed of two segments (5a and 5b), of which a first segment (5a), in terms of flow direction, has a cross section that increases in the direction of flow and a downstream adjoining second segment (5b) has a cross section that decreases in the direction of flow. Optionally, the outlet section (6) is similarly formed of two sections (6a, 6b).

11 Claims, 2 Drawing Sheets

MAGNETIC FLOWMETER

BACKGROUND OF THE INVENTION

1. Field of the Invention

The invention relates to a magnetic flowmeter for measuring the flow of a flowing medium having a measuring tube, a unit for generating a magnetic field that generates a magnetic field at least partially permeating the measuring tube, two electrodes for detecting a measuring voltage induced in the flowing medium and a housing incorporating the measuring tube, preferably also the unit for generating a magnetic field and the electrodes, wherein the measuring tube has a cross section that changes over its length and preferably the cross section in the middle section of the measuring tube is less than at the beginning and end of the measuring tube, preferably the cross section of the measuring tube is rectangular in its middle section or square and wherein the housing preferably has a circular cross section.

2. Description of Related Art

Magnetic flowmeters have been known extensively from the prior art for decades; see, Technische Durchflussmessung" by Prof. Dr.-Ing. K. W. Bonfig, 3. Edition, Vulkan-Verlag Essen, 2002, pages 123 to 167 for a description.

The basic principle of a magnetic flowmeter for measuring the flow of a flowing medium goes back to Faraday, who, in the year 1832, suggested using the principle of electrodynamic induction for measuring the velocity of flow of a flowing medium. According to Faraday's law of induction, electrical field intensity is created perpendicular to the direction of flow and perpendicular to the magnetic field in a flowing medium that carries charge carriers along with it and flows through a magnetic field. Faraday's law of induction is used by magnetic flowmeters in that a magnetic field is created by a unit for generating a magnetic field, which normally has two magnetic coils supplied with current, and at least partially lead through a measuring tube, wherein the generated magnetic field has at least one component that runs perpendicular to the direction of flow. Within the magnetic field, each volume element of the flowing medium having the field intensity created in this volume element moving through the flowing medium and having a certain number of charge carriers contributes to a measuring voltage that can be detected via the electrodes.

As an example of the magnetic flowmeters that form the basis of this invention, German patent disclosures 197 08 857; 10 2004 063 617 and corresponding U.S. Pat. No. 7,261,001 B2; German patent disclosure 10 2008 057 756 and corresponding U.S. patent application 2010/132478 A1 are cited here. The content of these disclosures is hereby specifically incorporated by reference into the present application.

SUMMARY OF THE INVENTION

Even though, as is mentioned above, magnetic flowmeters have been widely known for decades and in a nearly unmanageable amount of embodiments, improvements are still desired and also possible in respect to magnetic flowmeters. Consequently, the object of the invention is to improve the magnetic flowmeter described in the introduction in respect to its ability to achieve a considerable accuracy of flow measurement also in very different flowing media, in particular also in liquid media that carry solids having substantial size.

The magnetic flowmeter designed according to the invention is initially and essentially wherein the inlet section of the measuring tube is formed of two segments and the first segment, in terms of flow direction, has a cross section that increases in the direction of flow and the second segment has a cross section that decreases in the direction of flow.

In the known magnetic flowmeters in which the measuring tube has an inlet section, an outlet section and a measuring length between the inlet section and the outlet section, the inlet section has a cross section decreasing in the direction of flow and the outlet section has a cross section increasing in the direction of flow. In contrast, in the magnetic flowmeter according to the invention, the inlet section having a first segment begins with a cross section increasing in the direction of flow.

In the magnetic flowmeter according to the invention, the first segment of the inlet section of the measuring tube can have a smaller cross section on the input side than on the output side in a ratio of 1:5 to 1:2, preferably in a ratio of about 1:3. In particular, the first segment of the inlet section of the measuring tube can have a diameter of 15 mm on the input side and a diameter of 25 mm on the output side.

What is shown above in respect to the inlet section of the measuring tube of the magnetic flowmeter according to the invention, does not necessarily have to be carried out in the outlet section of the measuring tube. However, it is recommended that the embodiment be designed so that the output side corresponds to the input side, i.e., the outlet section of the measuring tube also is formed of two segments with the first segment, in terms of flow direction, having a cross section that increases in the direction of flow and the second segment having a cross section that decreases in the direction of flow. Here, the relationship between cross sections can be implemented in such a manner as is described above in respect to the input side.

In magnetic flowmeters, thus in the magnetic flowmeter according to the invention, the measuring tube is naturally not to be designed conductively, at least not on the surfaces coming in contact with the flowing medium. Thus, the measuring tube can be designed overall of non-conductive material, in particular of plastic or of ceramics. However, designs are possible in which the measuring tube is made essentially of a conductive material the inner surface of which that comes into contact with the flowing medium being coated so as not to be conductive, e.g., it is recommended to provide the measuring tube with a HALAR®(ethylene-chlorotrifluoroethylene resin) coating or with a PEEK (polyether ether ketone) coating.

It is described above that, in the magnetic flowmeter on which the invention is based, the cross section of the measuring tube in its middle section, i.e., the cross section of the measuring section of the measuring tube, can be designed to be rectangular or square. Preferably, the cross section of the measuring section of the measuring tube is designed to be rectangular. Naturally, the measuring section has to have such a cross section that the solids being carried by the liquid medium can pass through the measuring section. The narrow side of the measuring section of the measuring tube thus has to be at least as large as the maximum dimensions of the solids being carried by the liquid medium.

In the magnetic flowmeter according to the invention, electrodes can be arranged to detect a measuring voltage induced in the flowing medium on the long side of the measuring section of the measuring tube as well as on the narrow side; preferably, however, the electrodes are implemented on the narrow side; see German patent disclosure 10 2005 019 418 and corresponding U.S. Pat. No. 7,383,739 B2. The electrodes can also have a conductive diamond coating. How this diamond coating is implemented is described the above cited German patent disclosure 10 2005 019 418 and corresponding U.S. Pat. No. 7,383,739 B2. However, it is particularly advantageous when the electrodes have a tungsten-carbide coating.

The functionality of a magnetic flowmeter of the type described in the introduction can also be improved in terms of method, here again, mainly in respect to the ability to achieve a substantial accuracy of flow measurement also with liquid media carrying solids of substantial size. Thus, an object of the invention is also to provide a method for operating a magnetic flowmeter of the type described in the introduction, which is wherein the unit for generating a magnetic field is supplied with a current at a frequency of 25 Hz and/or with a current (peak-peak) of 150 mA to 350 mA, in particular of about 250 mA. Normally, a much smaller frequency and a smaller current are used.

The magnetic flowmeter is particularly suitable for use in rotation filling machines for determining the fill level of containers such as bottles or cans. It can be located between the product supply and a fill valve, but can also be part of a fill valve. In this application, the measurement of flow occurs using at least two flowing media that can differ in their amount, density, consistence, in particular their viscosity, conductivity and velocity. In particular, a medium can contain fibers, particles, fruit or vegetable pieces or grains.

In detail, there are different possibilities for designing and further developing the magnetic flowmeter according to the invention and different possibilities for operating a magnetic flowmeter of the type described in the introduction as will be apparent from the embodiment described in the following and in the shown the accompany drawings.

DETAILED DESCRIPTION OF THE INVENTION

Figure 1:
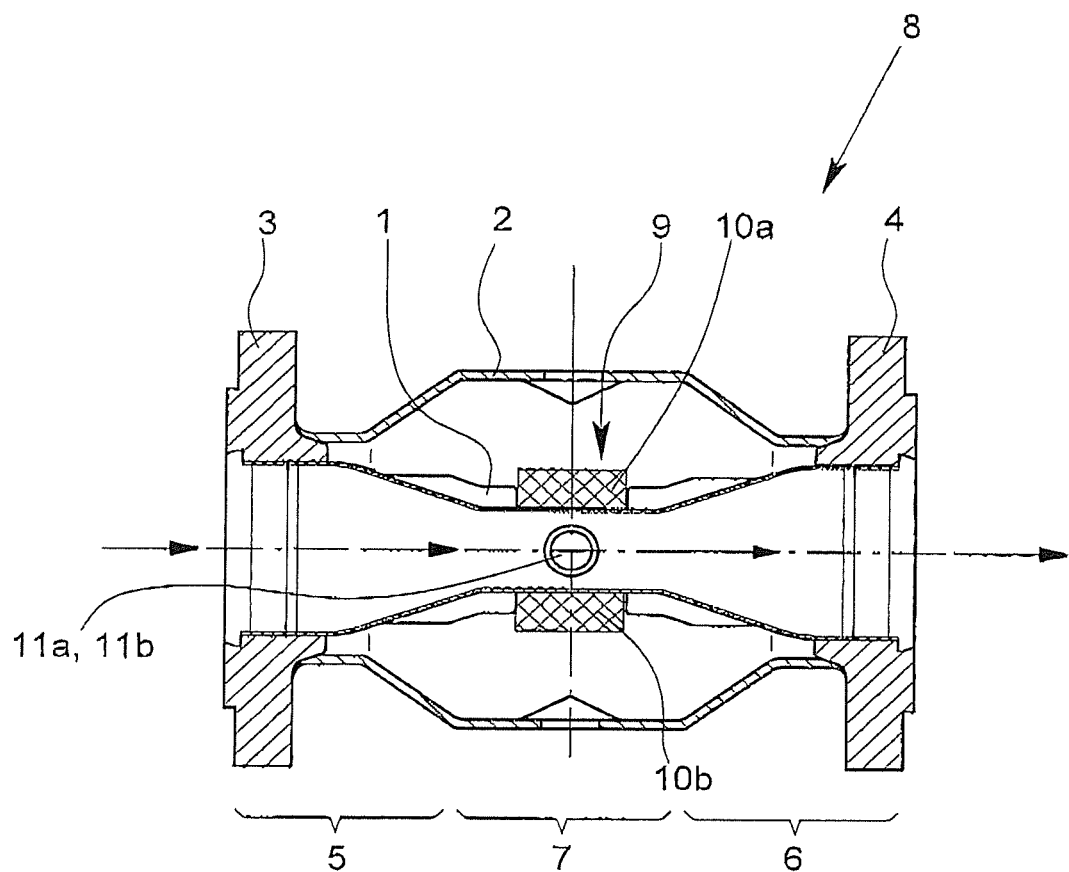
FIG. 1 is a first schematic cross-sectional view of a magnetic flowmeter for flow measurement of a flowing medium and FIG. 2 shows a second schematic cross-sectional view of a flowmeter as shown in more detail in more detail.
Figure 2:
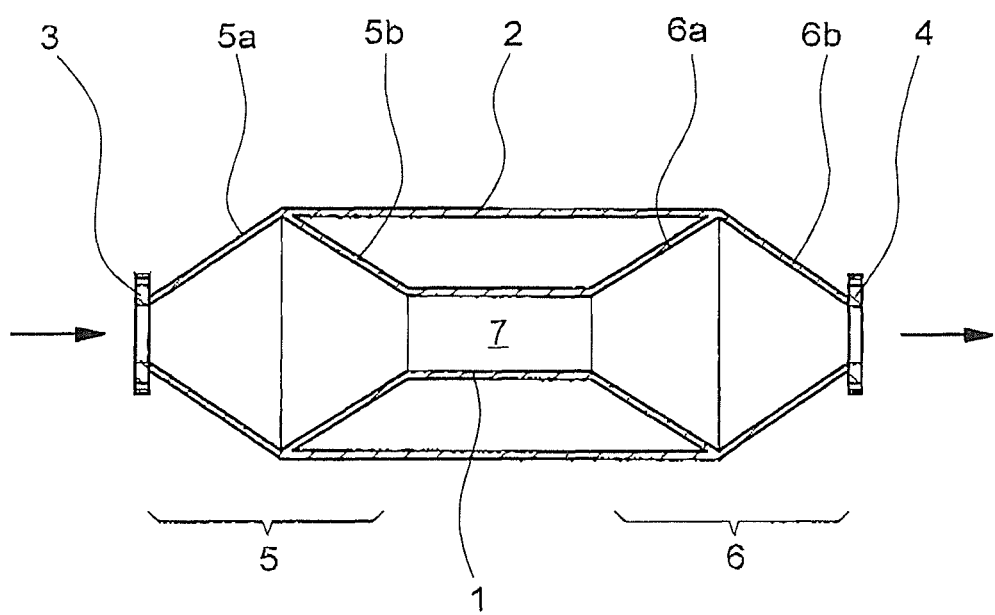

The illustrated magnetic flowmeter 8 has, as necessary for its function, a measuring tube 1, a unit for generating a magnetic field 9 that at least partially permeates the measuring tube 1 and which has two magnetic coils 10a, 10b. The flowmeter 8 also has two electrodes 11a, 11b for detecting a measuring voltage induced in the flowing medium. The magnetic flowmeter 8 also includes a housing 2 incorporating the measuring tube 1, the unit for generating a magnetic field 9 and the electrodes 11a, 11b, the housing 2 having a circular cross section and being provided with flanges 3, 4 on opposite ends as shown.

The measuring tube 1 has a cross section that varies over its length and the cross section is smaller in the middle section of the measuring tube 1 than at the beginning of the measuring tube 1 and at its end; in the illustrated embodiment, the cross section of the measuring tube 1 is rectangular in its middle section. The measuring tube 1 thus formed of an inlet section 5, an outlet section 6 and a measuring section 7 between the inlet section 5 and the outlet section 6.

The magnetic flowmeter 8 according to the invention is substantially improved in comparison with the known magnetic flowmeters on which the invention in based, primarily in respect to its ability to achieve considerable accuracy of flow measurement also in very different flowing media, especially also in liquid media that carry solids of substantial size. It is improved in that the inlet section 5 of the measuring tube 1 is formed of two segments 5a, 5b and the first section 5a has an increasing cross section in the direction of flow and the second segment 5b has a decreasing cross section in the direction of flow.

It holds true for the illustrated embodiment that the first segment 5a of the inlet section 5 of the measuring tube 1 has a smaller cross section on the input side than on the output side at a ratio of about 1:3. In reality, the first segment 5a of the inlet section 5 of the measuring tube 1 has a diameter of 15 mm on the input side and a diameter of 25 mm on the output side.

In the illustrated embodiment, the magnetic flowmeter 8 according to the invention is designed on the output side as described for the input side. The outlet section 6 of the measuring tube 1 thus also is formed of two segments 6a, 6b. Here, the first segment 6a in view of flow direction has an increasing cross section in the direction of flow and the second segment 6b has a decreasing cross section in the direction of flow.

In magnetic flowmeters, the measuring tube 1 cannot to be conductive, at least not on the surface facing the flowing medium. For this reason, the measuring tube 1 is provided with a HALAR® (ethylene-chlorotrifluoroethylene resin) coating or a PEEK (polyether ether ketone) coating in the embodiment.

Furthermore, it holds true for the illustrated embodiment that the measuring tube 1 has a rectangular cross section in its middle section, i.e., the measuring section 7. The second segment 5b of the inlet section 5 of the measuring tube 1 thus merges from a circular cross section into a rectangular cross section. Correspondingly, it is such that the first segment 6a of the outlet section 6 of the measuring tube 1 merges from a rectangular cross section into a circular cross section. The first segment 5a of the inlet section 5 and the second segment 6b of the outlet section 6 preferably have a continuous circular cross section.

It is further true for a preferred embodiment of the magnetic flowmeter 8 according to the invention that the electrodes 11a, 11b are provided on the narrow side of the rectangular measuring section 7 of the measuring tube 1 and have a tungsten-carbide coating.

As described further above, the functionality of the magnetic flowmeter 8 described in the introduction, in particular, also the functionality of the magnetic flowmeter according to the invention are improved using a particular mode of operation. This is wherein the unit for generating a magnetic field is supplied with a current at a frequency of 10 Hz to 50 Hz, in particular with a frequency of 25 Hz and/or with a current (peak-peak) of 150 mA to 350 mA, in particular of about 250 mA.

The magnetic flowmeter 8 according to the invention can be used, in particular, also in rotation filling machines for determining the filled volume of containers, such as bottles or cans, either between product supply and a fill valve or as a component of a fill valve. Here, the measurement of flow occurs using at least two flowing media in succession, especially of media that can be differentiated in terms of their amount, density, consistency, hence primarily viscosity, conductivity and velocity. The magnetic flowmeter 8 according to the invention can be used when the flowing media is, for example, beer, soft drinks, cola beverages, mineral water, sparkling wine, wine-based beverages, soft drinks with fruit pulp, vegetable juices, fruit juices, non-carbonated water, vinegar, milk, chocolate milk, mixed milk drinks, fruit fiber and cell paste, pulp paste, fruit sauce, fruit pieces, grains and vegetable pieces separated in liquid phase. The solids contained in the liquid medium normally have maximum dimensions of 8×8×8 mm.

What is claimed is:

1. Magnetic flowmeter for measuring the flow of a flowing medium, comprising:
   a measuring tube,
   means for generating a magnetic field that at least partially permeates the measuring tube,
   two electrodes for detecting a measuring voltage induced in the flowing medium and
   a housing surrounding at least a central portion of the measuring tube,
   wherein the measuring tube has a cross section that changes in a lengthwise direction,
   wherein an inlet section of the measuring tube is formed of two segments, a first segment of which has a cross section that increases in a direction of flow and a downstream adjoining second segment of which has a cross section that decreases in the direction of flow, and
   wherein the first segment of the inlet section of the measuring tube has a cross section that is smaller on an input side than on an output side in a ratio of 1:5 to 1:2.

2. Magnetic flowmeter according to claim 1, wherein said ratio is about 1:3.

3. Magnetic flowmeter according to claim 1, wherein the first segment of the inlet section of the measuring tube has a diameter of 15 mm on the input side and a diameter of 25 mm on the output side.

4. Magnetic flowmeter according to claim 1, wherein the outlet section of the measuring tube is formed of two segments a first segment of which has a cross section that increases in the direction of flow and a downstream adjoining second segment of which has a cross section that decreases in the direction of flow.

5. Magnetic flowmeter according to claim 1, wherein the measuring tube has a rectangular cross section in a middle, measuring section of the measuring tube, and wherein the electrodes are provided on narrow sides of the rectangular cross section of the measuring section of the measuring tube.

6. Magnetic flowmeter according to claim 1, wherein the electrodes have a tungsten-carbide coating.

7. Magnetic flowmeter for measuring the flow of a flowing medium, comprising:
   a measuring tube,
   means for generating a magnetic field that at least partially permeates the measuring tube,
   two electrodes for detecting a measuring voltage induced in the flowing medium and
   a housing surrounding at least a central portion of the measuring tube,
   wherein the measuring tube has a cross section that changes in a lengthwise direction,
   wherein an inlet section of the measuring tube is formed of two segments, a first segment of which has a cross section that increases in a direction of flow and a downstream adjoining second segment of which has a cross section that decreases in the direction of flow, and
   wherein a flow-facing surface of the measuring tube is provided with a coating of ethylene-chlorotrifluoroethylene resin (HALAR®) or polyether ether ketone (PEEK).

8. Method for operating a magnetic flowmeter for measuring flow, comprising the steps of:
   providing a magnetic flowmeter having a measuring tube, a unit for generating a magnetic field that at least partially permeates the measuring tube, two electrodes for detecting a measuring voltage induced in the flowing medium and a housing surrounding at least a central portion of the measuring tube,
   wherein the measuring tube has a cross section that changes in a lengthwise direction, wherein an inlet section of the measuring tube is formed of two segments, a first segment of which has a cross section that increases in a direction of flow and a downstream adjoining second segment of which has a cross section that decreases in the direction of flow, and supplying the unit for generating a magnetic field with a current at a frequency of 10 Hz to 50 Hz.

9. Method according to claim 8, wherein the current supplied has a frequency of 25 Hz.

10. Method for operating a magnetic flowmeter for measuring flow, comprising the steps of:
    providing a magnetic flowmeter having a measuring tube, a unit for generating a magnetic field that at least partially permeates the measuring tube, two electrodes for detecting a measuring voltage induced in the flowing medium and a housing surrounding at least a central portion of the measuring tube,
    wherein the measuring tube has a cross section that changes in a lengthwise direction, wherein an inlet section of the measuring tube is formed of two segments, a first segment of which has a cross section that increases in a direction of flow and a downstream adjoining second segment of which has a cross section that decreases in the direction of flow, and supplying the unit for generating a magnetic field with a current (peak-peak) of 150 mA to 350 mA.

11. Method according to claim 10, wherein the current supplied is 250 mA (peak-peak).

* * * * *